United States Patent Office 2,841,611
Patented July 1, 1958

2,841,611

N-ALKYL SUBSTITUTED ALKYLENE POLYAMINE METHYLENE PHOSPHONIC ACIDS

Frederick C. Bersworth, Framingham Center, Mass., assignor to The Dow Chemical Company, Midland, Mich., a corporation of Delaware No Drawing. Application September 1, 1954
Serial No. 453,701

6 Claims. (Cl. 260—500)

This invention relates to alkylene polyamine methylene phosphonic acids and has for its object the provision of N-alkyl-substituted-alkylene polyamine methylene phosphonic acids conforming to the following generic formula:

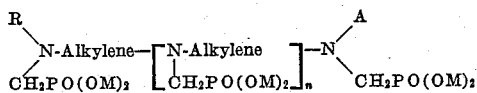

where R is one of the group alkyl, aralkyl, containing as many as 18 carbon atoms or more; A is one of the group R and —$CH_2PO(OM)_2$; alkylene is one of the group —$CH_2CH_2$—, —$CH(CH_3)CH_2$— and —$CH_2CH_2CH_2$—; $n = 0, 1, 2, 3, 4$; M=alkali metal, hydrogen, alkylammonium and ammonium.

Another object is to provide a method of producing the said compounds.

Another object is to provide a new type of metal deactivator and metal carrier of wide utility in aqueous and organic solvent systems.

Another object is to provide an organic compound which is a metal carrier or deactivator in organic solvent systems.

Other objects and advantages will be apparent as the invention is more fully hereinafter disclosed.

In accordance with these objects I have discovered that when the amino hydrogens of the alkylene polyamine methylene phosphonic acids described and claimed in United States Patent 2,599,807, issued June 10, 1952, are displaced by alkyl groups, the resulting compounds possess new and unexpected properties. The alkyl groups greatly enhance solubility of the alkylene polyamine methylene phosphonic acids in organic solvents. The enhancement of organic solubility is much greater than that observed for the corresponding carboxylic acids, such as dialkylethylene diamine diacetic acids. Furthermore, the resulting methylene phosphonic acids and their salts are much more powerful metal deactivators in these organic solvents than are the corresponding carboxylic acids. In addition to this, it was found that the alkyl-substituted phosphonates of this invention are also comparable as metal carriers to the corresponding carboxylic acid type.

In accordance with this discovery I have developed a general method of producing these N-alkyl substituted alkylene polyamine methylene phosphonic acids by which an N-alkyl substituted alkylene polyamine is dissolved in water containing caustic alkali sufficien to give a pH of from 10–11 and the solution is heated in the vicinity of 80–100° C., and chloromethylene phosphonate disodium salt is added slowly with agitation in an amount sufficient to substitute all the amino hydrogens present on the amine. After the addition is complete the solution is refluxed for about ten hours or more. After the reaction is complete, as detected by determination of the chloride ion liberated, the product is used directly, or purified by one of various methods to be described below.

Generally the compounds are prepared in alkaline solution and used directly as their sodium salts without isolation. Where the acid form of the compound is desired, it is isolated and used as such. Other alkali metal salts, such as potassium, lithium, cesium and rubidium, or ammonium or alkyl ammonium may be prepared by reaction of the acid with the corresponding base in appropriate molar amounts to form mono-alkali metal or poly-alkali metal salts. The common simple amine salts, such as methyl, ethyl or propyl amine, are formed by direct addition of the amine to the acid solution, with precaution being taken to avoid loss of volatile amine.

In cases where the alkyl-substituted alkylene polyamine is insoluble in water, the reaction is carried out in absolute alcohol. This is accomplished by dissolving the alkyl-substituted alkylene polyamine in 5–10 times its volume of aqueous-tertiary butyl alcohol and adding solid sodium hydroxide in a molar amount equivalent to the number of moles of replaceable hydogens on the nitrogens of the amine. Then an equal number of moles of chloromethylene phosphonic acid diethyl ester are slowly added while the solution is stirred and refluxed. After the addition is complete, the solution is refluxed until the reaction is complete, the sodium chloride is then filtered off and the alcohol removed by distillation. The polyamino polyphosphonic acid is isolated by acid hydrolysis of the reaction product.

The organic alkyl polyamino polymethylene phosphonic acids herein described are valuable as detergents, metal carriers and as additives to lubricating oils. Metallic salts of these compounds, such as those of Al, Ba, Ca, Pb, etc., are much more stable and less ionic than the corresponding salts of the carboxylic acid type. This is probably the reason for their better solubility and miscibility in organic solvents and hydrocarbon oils.

Typical examples of such useful additives to lubricating oils are the barium salt of N,N'-dibenzyl ethylene diamine-N,N'-dimethylenephosphonate:

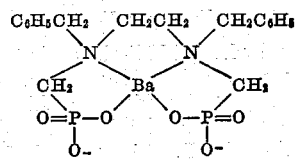

and the lead salt of N-octadecyl-ethylene diamine-trimethylene phosphonic acid.

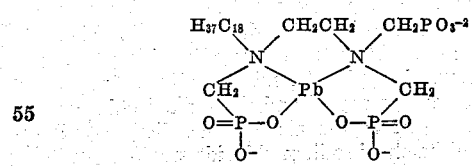

The residual charges on these metal derivatives may be neutralized by such salt forming groups as alkali metal and alkyl ammonium ions.

In compounds of the above types the heavy metal is not salt-like in properties but exists in the form of a true organic metal compound. For simplicity these compounds have been formulated on the ethylene diamine nucleus, but in accordance with the invention compounds based on any N-alkyl substituted alkylene polyamine, such as N-alkyl or N-aryl or N-alkaryl substituted diethylene triamine, triethylene tetramine, tetraethylene pentamine, etc., may be used. It will be noted that the basic consideration is to utilize an alkylene nucleus which puts 2–3 carbon atoms between the nitrogens and then to put the methylene phosphonic acid groups on the nitrogens so that the resultant compound can form 5–6 membered chelate rings. Thus, with the N-alkylene structure repeated as follows:

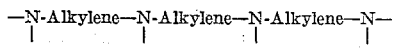

each pair of nitrogen atoms when it carries methylene phosphonic acid groups is available for chelation.

An interesting advantage of the compounds of the present invention over other types of metal deactivators is illustrated by the fact that N,N'-dibutyl ethylene diamine diacetic acid does not bind alkaline earths in aqueous solution, while the corresponding N,N'-dibutyl ethylenediamine-dimethylene-phosphonate ion is an effective deactivator of alkaline earth ions such as magnesium ion.

Example I

One mole of mono-N-ethyl-ethylenediamine is dissolved in 500 ml. of water and three moles of sodium hydroxide (20% aqueous solution) are added with cooling. The resulting solution is brought to reflux and rapidly stirred while six moles of sodium hydroxide (20% aqueous solution) and three moles of chloromethylene phosphonic acid (ClCH$_2$PO(OH)$_2$), also in 20% aqueous solution, are added simultaneously from separate containers. The addition is regulated so as to be complete in three hours, and the resulting pale yellow aqueous solution is refluxed for 15 hours.

The product may be isolated as the sodium salt by concentration of the solution under reduced pressure, and filtering off the sodium chloride. The concentrated aqueous solution of the product was then slowly poured into absolute ethanol with vigorous stirring. The solid which crystallized is the sodium salt of N-butyl-ethylenediamine trimethylenephosphonic acid.

The pure acid may be obtained by absorption of the anion on the hydroxy form of an anion exchange resin, washing, and elution with hydrochloric acid. The pure acid was obtained as a partially crystalline material on evaporation of the acid. It is believed to have the formula:

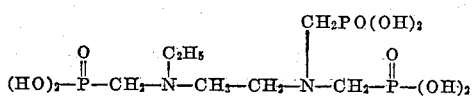

Example II

One mole of anhydrous N,N'-dibenzyl ethylenediamine was dissolved in a liter of tertiary butyl alcohol and two moles of solid sodium hydroxide were added. Two moles of chloromethylene phosphonic acid diethyl ester (ClCH$_2$PO(OEt)$_2$), (B. P. 135°–145° C., 20 mm.), dissolved in 500 ml. of absolute ethanol were then added over a period of four hours while the solution was refluxed and stirred. The progress of the reaction was observed by the precipitation of sodium chloride from the reaction mixture. After ten hours of additional reflux, the reaction was judged to be substantially complete, the reaction mixture was cooled and the sodium chloride was filtered off. Most of the alcohol was distilled off and another small batch of sodium chloride was removed by filtration. The resulting syrupy solution was then added to two liters of dilute (6 N) hydrochloric acid and refluxed for four hours. The dibenzyl ethylene diamine dimethylene phosphonic acid was obtained as a crystalline material on evaporation of the hydrochloric acid and may be recrystallized from water. Elementary chemical analysis indicates that it has the following formula:

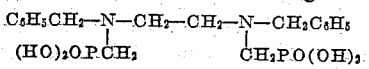

Example III

Octadecyl diethylene triamine was treated according to Example I. The addition of four moles of sodium hydroxide to the aqueous solution of the amine resulted in a separation of the reaction mixture into two layers. However, the reaction was carried out by addition of 500 ml. more of water and 1000 ml. of tertiary butyl alcohol. The reaction was then continued as described in Example I except that four moles of chloromethyl phosphonic acid were added and eight moles of sodium hydroxide were added at the same time. Sodium salt of the product was obtained as before, but the pure acid was obtained as a syrup which could not be crystallized. It is believed to have the formula:

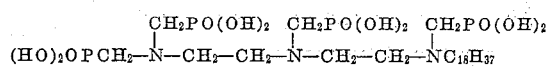

Example IV

One mole of dioctadecyl ethylene diamine was treated with two moles of chloromethylphosphonic acid diethyl ester according to the procedure of Example II, the only difference being a larger volume of solvent (one liter additional) and 5 hours longer reaction time at reflux. The product, a waxy solid, is believed to have the following structure:

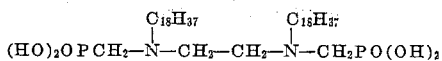

Example V

One mole of N,N'-dimethyl-propylene diamine $$CH_3—NH—CH(CH_3)CH_2—NH—CH_3$$

was treated with two moles of chloromethylene phosphonic acid according to the method of Example I except that all the reagents were mixed simultaneously and then refluxed for eight hours. The free acid is believed to have the following structure:

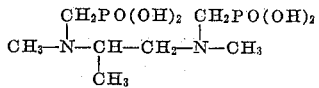

Example VI

One mole of N,N''''-dibutyl tetraethylenepentamine was treated with five moles of chloromethylenephosphonic acid according to the method of Example I. The product was isolated as the solid sodium salt and no attempt was made to isolate the pure acid as a solid material. The alkali metal salt is a sequestering agent with high capacity for combination with alkaline earth and heavy metal ions, and its composition conforms to the following formula:

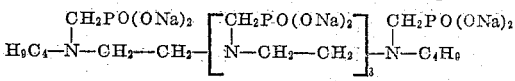

Example VII

A similar product was prepared in an identical manner from one mole of monobutyl tetraethylene pentamine and six moles of chloromethylene phosphonic acid to give a compound believed to have the following structure:

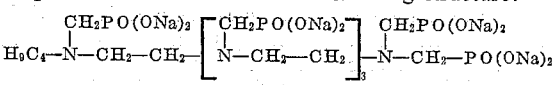

Its properties are similar to the compound of Example V except that it seems to have somewhat greater affinity for alkaline earth ions.

Example VIII

Anhydrous monobenzyl trimethylene diamine was converted to monobenzyl trimethylene diamine trimethylene phosphonic acid by the procedure of Example II in which one mole of monobenzyl trimethylenediamine was treated with three moles of chloromethylene phosphonic acid diethyl ester. The pure acid is believed to have the formula:

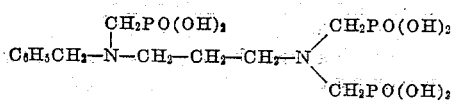

Example IX

The procedure of Example II was followed exactly with N,N'-dibutyl trimethylene diamine in place of dibenzyl ethylene diamine to give a good yield of the compound:

$$\begin{array}{c} CH_2PO(OH)_2 \quad\quad CH_2PO(OH)_2 \\ | \quad\quad\quad\quad\quad\quad\quad | \\ H_9C_4-N-CH_2-CH_2-CH_2-N-C_4H_9 \end{array}$$

The structure of the compounds formed is such that two methylene phosphonic acid groups are placed in N,N' relationship with each other in a polyamine so that a chelating structure is developed. In forming these compounds, it is important to have this N,N-phosphonic acid arrangement in order that polar groups will be available for reaction with metals and formation of inner chelate rings. On one of the remaining amino nitrogens in the combination of a diamine a third phosphonic acid group is introduced for the solubilizing effect it has on the composition. Further to modify the solubility of the compound, the fourth amino hydrogen position is substituted with an organic group such as a hydrocarbon or alkyl group.

Similar considerations apply to the preparation of compounds which contain multiples of the -Alkylene-N- structure.

Thus, by providing the N,N'-methylene phosphonic acid structure in the polyalkylene polyamine the chelate function of the compound is preserved and by balancing the size of the organic substituent in one of the remaining amino hydrogen positions against the presence of a methylene phosphonic group in another amino hydrogen position, the chelating properties are retained and the solubility of the compounds may be matched against the particular application for which they are sought.

Also, the third methylene phosphonic acid group in the combination renders it available for polymerization reactions by dehydration so that pyrophosphonic acid compounds are formed. These pyrophosphonic acid compounds may be formed before or after chelation. In fact, during the isolation of the compounds described specifically in the several examples, it is possible to induce a certain degree of polymerization of the phosphonic acids by making the conditions under which the isolation is carried out more drastic. That is, in the evaporation to concentrate the solution of the compound the use of elevated temperatures approximating the boiling range of the solution will induce some dehydration of the phosphonic acid compounds with resultant polymerization. If it is desired, a dehydrating agent such as phosphorus pentoxide may be introduced into the medium containing the reaction product from any of the examples, thereby to dehydrate the phosphonic acid groups and cause the formation of polymers of the methylene phosphonic acid groups. This reaction is illustrated as follows:

$$\begin{array}{c} \quad\quad\quad\quad O \quad\quad\quad\quad\quad O \\ \quad\quad\quad\quad \| \quad\quad\quad\quad\quad \| \\ CH_2-N-CH_2-P-O\boxed{H\ HO}-P-N-CH_2 \\ | \quad\quad\quad\quad | \quad\quad\quad\quad\quad | \quad\quad | \\ R \quad\quad\quad\quad OH \quad\quad\quad\quad OH \quad R \\ \quad\quad\quad\quad\quad\quad O \quad\quad O \\ \quad\quad\quad\quad\quad\quad \| \quad\quad \| \\ CH_2-N-CH_2-P-O-P-N-CH_2 \\ | \quad\quad\quad\quad | \quad\quad\quad | \quad\quad | \\ R \quad\quad\quad\quad OH \quad OH \quad R \end{array}$$

R = residual nitrogen valence bonded to similar or dissimilar groups; i. e., alkyl, aralkyl or alkylene phosphonic acid.

This reaction, summarized in general form, applies to the several products described in the specific examples. Phosphonic acids are rather readily dehydrated and forced into polymerization reactions, with the result that compounds with quite high molecular weight can be prepared. Also, a sufficiently high degree of dehydration in the phosphonic acid portion of the compounds can produce carbon-phosphorus bonds as well as carbon-nitrogen bonds in the compound and thereby render them quite toxic to insects.

The methylene phosphonic acid compounds per se are useful in chelating agents and in insecticidal compositions, because they function as wetting agents, water softeners, and also are at least in part toxic to the insects.

In the specific examples reference has been made to isolation of the principal reaction product which corresponds to those theoretically obtainable from the reactants used. As indicated, the reaction product itself will consist largely of the compounds sought and will also contain side reaction products which will be polymers of the phosphonic acids as well as variations of the basic product. It is, therefore, possible whenever the synthesis is carried out to utilize the reaction product directly as a chelating agent inasmuch as the side products also have their chelating properties.

This application is a continuation-in-part of my pending application Serial No. 292,199, filed June 6, 1952, now abandoned.

It is believed apparent from the above disclosure and specific examples given that the invention may be widely varied without essential departure therefrom and all such modifications and departures from the invention are contemplated as may fall within the scope of the following claims.

What is claimed is:

1. Compounds conforming to the formula:

$$\begin{array}{c} R \quad\quad\quad\quad\quad\quad\quad\quad\quad\quad\quad\quad A \\ \diagdown \quad\quad\quad\quad\quad\quad\quad\quad\quad\quad\quad\quad \diagup \\ N-Alkylene\!\left[-N-Alkylene\ \right]-N \\ \diagup \quad\quad\quad\quad | \quad\quad\quad\quad\quad\quad\quad\quad\quad \diagdown \\ CH_2PO(OM)_2 \quad CH_2PO(OM)_2 \Big]_n \quad CH_2PO(OM)_2 \end{array}$$

where R is selected from the group consisting of alkyl, aralkyl; A is selected from the group consisting of alkyl, aralkyl and —$CH_2PO(OM)_2$; alkylene is selected from the group consisting of —$CH_2CH_2$—, —$CH(CH_3)CH_2$—, and —$CH_2CH_2CH_2$—; n is an integer in the range 0, 1, 2, 3, 4; M is selected from the group consisting of alkali metal, hydrogen, ammonium base.

2. Compound conforming to the formula:

$$\begin{array}{c} \quad\quad\quad\quad\quad\quad\quad\quad\quad\quad\quad\quad\quad\quad CH_2PO(OH)_2 \\ \quad\quad O \quad\quad C_2H_5 \quad\quad\quad\quad\quad\quad\quad\quad | \quad\quad O \\ \quad\quad \| \quad\quad | \quad\quad\quad\quad\quad\quad\quad\quad\quad\quad\quad\quad \| \\ (HO)_2-P-CH_2-N-CH_2-CH_2-N-CH_2-P-(OH)_2 \end{array}$$

3. Compound conforming to the formula:

$$\begin{array}{c} C_6H_5CH_2-N-CH_2-CH_2-N-CH_2C_6H_5 \\ | \quad\quad\quad\quad\quad\quad\quad\quad\quad\quad\quad | \\ (HO)_2OPCH_2 \quad\quad\quad\quad\quad\quad CH_2PO(OH)_2 \end{array}$$

4. Compound conforming to the formula:

$$\begin{array}{c} \quad\quad\quad\quad CH_2PO(OH)_2 \quad CH_2PO(OH)_2 \quad CH_2PO(OH)_2 \\ \quad\quad\quad\quad | \quad\quad\quad\quad\quad\quad | \quad\quad\quad\quad\quad\quad | \\ (HO)_2OPCH_2-N-CH_2-CH_2-N-CH_2-CH_2-NC_{18}H_{37} \end{array}$$

5. Compound conforming to the formula:

$$\begin{array}{c} CH_2PO(OH)_2 \quad\quad\quad\quad\quad\quad CH_2PO(OH)_2 \\ | \quad\quad\quad\quad\quad\quad\quad\quad\quad\quad\quad\quad \diagup \\ C_6H_5CH_2-N-CH_2-CH_2-CH_2-N \\ \quad\quad\quad\quad\quad\quad\quad\quad\quad\quad\quad\quad\quad\quad \diagdown \\ \quad\quad\quad\quad\quad\quad\quad\quad\quad\quad\quad\quad\quad\quad\quad\quad CH_2PO(OH)_2 \end{array}$$

6. Compound conforming to the formula:

$$\begin{array}{c} CH_2PO(OH)_2 \quad\quad CH_2PO(OH)_2 \\ | \quad\quad\quad\quad\quad\quad\quad\quad\quad\quad | \\ H_9C_4-N-CH_2-CH_2-CH_2-NC_4H_9 \end{array}$$

References Cited in the file of this patent

UNITED STATES PATENTS 2,599,807     Bersworth     June 10, 1952